United States Patent
Tokunaga

(10) Patent No.: US 6,896,408 B2
(45) Date of Patent: May 24, 2005

(54) TEMPERATURE DETECTION FROM DIFFERENCES IN OFF LEAK CURRENTS OF NMOS AND PMOS TRANSISTORS ON CPU CHIP

(75) Inventor: Yasuhiro Tokunaga, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 10/668,331

(22) Filed: Sep. 24, 2003

(65) Prior Publication Data

US 2004/0184510 A1 Sep. 23, 2004

(30) Foreign Application Priority Data

Mar. 19, 2003 (JP) ........................................ 2003-075123

(51) Int. Cl.[7] .......................... G01K 7/01; G01K 13/00; H01L 27/105
(52) U.S. Cl. ........................................ 374/178; 327/512
(58) Field of Search ................................ 374/163, 178, 374/512, 513, 141; 257/467, 470

(56) References Cited

U.S. PATENT DOCUMENTS

| | | | | | |
|---|---|---|---|---|---|
| 4,185,253 | A | * | 1/1980 | Lade et al. ................. | 374/178 |
| 4,300,048 | A | * | 11/1981 | Barbier et al. .............. | 374/178 |
| 4,994,688 | A | * | 2/1991 | Horiguchi et al. .......... | 327/513 |
| 5,961,215 | A | * | 10/1999 | Lee et al. .................... | 374/178 |
| 6,104,075 | A | * | 8/2000 | Karaki ........................ | 257/467 |
| 6,157,244 | A | * | 12/2000 | Lee et al. .................... | 374/178 |
| 6,426,671 | B1 | * | 7/2002 | Kono .......................... | 327/512 |
| 6,489,831 | B1 | * | 12/2002 | Matranga et al. ........... | 327/512 |
| 6,630,754 | B1 | * | 10/2003 | Pippin ........................ | 327/512 |
| 2004/0071026 | A1 | * | 4/2004 | Hidaka ....................... | 365/200 |

FOREIGN PATENT DOCUMENTS

JP         05-283749         10/1993

* cited by examiner

*Primary Examiner*—Diego Gutierrez
*Assistant Examiner*—Stanley J. Pruchnic, Jr.
(74) *Attorney, Agent, or Firm*—Volentine Francos & Whitt, PLLC

(57) ABSTRACT

A temperature detection circuit is provided inside a chip which is the same in which a CPU is provided, and includes a temperature detection part having a PMOS transistor and an NMOS transistor connected in series between a power supply potential VDD and a grounding potential. A stray capacitance between a junction (live node) between the PMOS transistor and the NMOS transistor, and the grounding potential, is charged with a current differential between the off leak current of the PMOS transistor and the off leak current of the NMOS transistor, thereby changing the potential of the live node. When the changed potential reaches a level of a threshold value in a given period of time, it is decided that the temperature of the CPU reaches a set temperature.

11 Claims, 6 Drawing Sheets

TEMPERATURE DETECTION FROM DIFFERENCES IN OFF LEAK CURRENTS OF NMOS AND PMOS TRANSISTORS ON CPU CHIP

BACKGROUND OF THE INVENTION

1. Field of the Invention

The invention relates to a semiconductor device provided with a temperature detection circuit, particularly relates to a semiconductor device provided with a temperature detection function of a semiconductor chip on which a logical circuit such as a central processing unit (hereinafter referred to as CPU) is mounted.

2. Related Art

A demand for high speed in a CPU serving as a logical circuit has grown recently. In connection with such a demand, a high speed operation of the CPU causes the increase of heat generation, resulting in the occurrence of phenomenon of accelerating increase of resistance value, increase of power consumption and deterioration of a semiconductor device. As a result, there occur a disadvantage of the operation of the CPU and a problem of overdrive of the CPU and the like.

A countermeasure has been taken to avoid this problem such that a temperature sensor is disposed outside the CPU to monitor the temperature, thereby sending out a warning before the CPU is overdriven. There is a system, for example, as an example of such a countermeasure, having a configuration such that an interface circuit for connecting between the CPU and an external circuit is provided, and a temperature sensor for measuring an ambient temperature is disposed outside the CPU, and also a sensor control circuit for controlling the temperature sensor is provided while the sensor control circuit is connected to the interface circuit and the CPU.

According to the above conventional system, if an ambient temperature of the CPU is higher than a set value, the sensor control circuit once receives information and supplies a processed signal to the CPU, whereby a process is executed such that an operating frequency is reduced or a warning is sent out or the like, thereby preventing the CPU from being overdriven.

There is another prior art wherein a forward current is supplied from a constant current source by a PN junction diode, and voltages at both ends of the diode are measured at that time, thereby measuring a temperature utilizing a relation between the voltage and the temperature (see, e.g. JP-A 5-283749).

However, the method of disposing the temperature sensor outside the CPU merely detects the ambient temperature of the CPU but does not detect the temperature of the CPU per se, thereby arising a problem that the temperature of the chip has not been controlled in real time with good accuracy.

SUMMARY OF THE INVENTION

There is provided a semiconductor device provided with a function to control a temperature of a CPU in real time with good accuracy by building a temperature detection circuit for directly measuring the temperature of the CPU in a semiconductor chip. According to the semiconductor device of the invention, a temperature detection circuit is provided inside a chip which is the same as the CPU, and it comprises a temperature detection part comprised of a PMOS transistor and an NMOS transistor connected in series to each other between a power supply potential VDD and a grounding potential, wherein a stray capacitance between a junction (live node) between the PMOS transistor and the NMOS transistor and the grounding potential is charged with a current differential between an off leak current of the PMOS transistor and an off leak current of the NMOS transistor, thereby changing the potential of the junction, and when the changed potential reaches a threshold voltage in a given period of time, it is decided that the temperature of the CPU reaches a set temperature.

PREFERRED EMBODIMENT OF THE INVENTION

Preferred embodiments of the invention are now described with reference to drawings.

Figure 2:
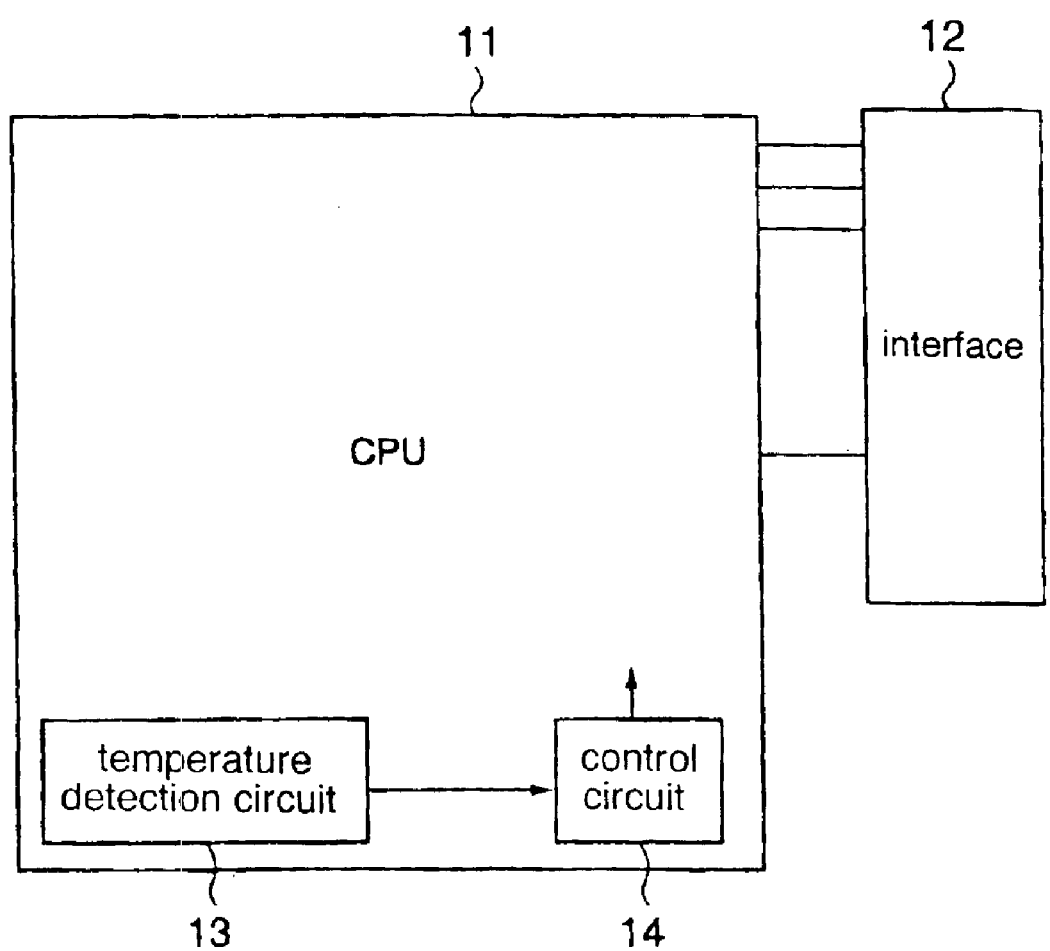
FIG. 2 is a view showing the entire configuration of the semiconductor device according to the invention.

FIG. 2 is a view showing the entire configuration of a semiconductor device of the invention, wherein an interface circuit 12 is connected to a CPU 11 for connecting between the CPU 11 and an external circuit. A temperature detection circuit 13 for detecting a chip temperature is connected to an interior of the CPU 11 and a control circuit 14 for controlling the temperature detection circuit 13 is connected to the temperature detection circuit 13. An output of the control circuit 14 is connected to the interior of the CPU 11.

Figure 1:
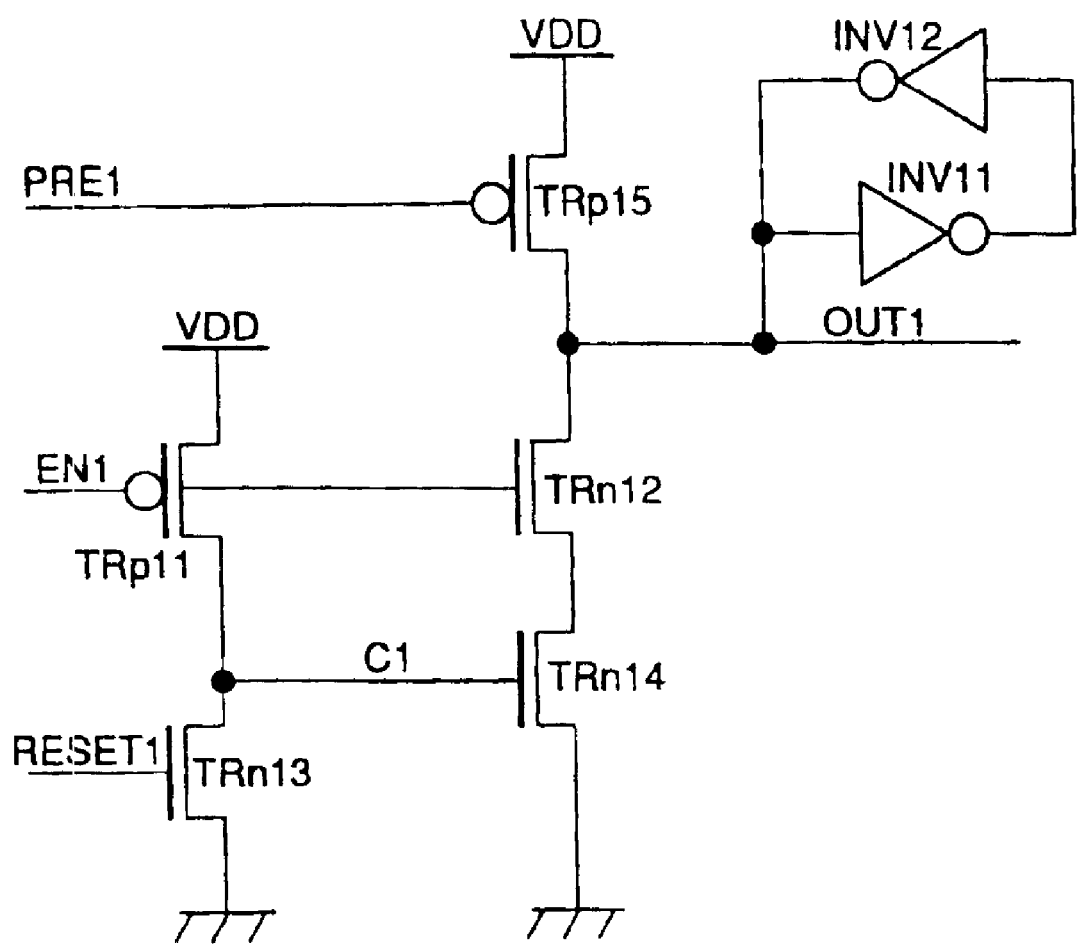
FIG. 1 is a circuit diagram of a temperature detection circuit of a semiconductor device according to a first embodiment of the invention.

First Embodiment:

FIG. 1 is a circuit diagram of a temperature detection circuit according to a first embodiment of the invention, wherein depicted by TRp is a p-channel MOS (PMOS) transistor and TRn is an n-channel MOS (NMOS) transistor. An input signal EN1 is connected to a gate of a PMOS transistor TRp11 and a gate of an NMOS transistor TRn12, and a reset signal RESET1 is connected to a gate of the NMOS transistor TRn13. Further, a node C1 (also called as a live node) is a junction between a drain of the PMOS transistor TRp11 and a drain of the PMOS transistor TRn13 and it is connected to a gate of an NMOS transistor TRn14. A source of the PMOS transistor TRp11 is connected to a power supply potential VDD. The NMOS transistor TRn12 is connected to a drain of the NMOS transistor TRn14 at its source, and to an output node OUT1 at its drain. A source of the NMOS transistor TRn14 is connected to a grounding potential GND. A PMOS transistor TRp15 is connected to the power supply potential VDD at its source, and to the output node OUT1 at its drain, and to a pre-charge signal PRE1 at its gate. Further, a data holding circuit structured by inverter circuits INV11 and INV12 is connected to the output node OUT1. The dimensions of the inverter are smaller than the dimensions of the NMOS transistor TRn12, the NMOS transistor TRn14 and the PMOS transistor TRp15.

Figure 3:
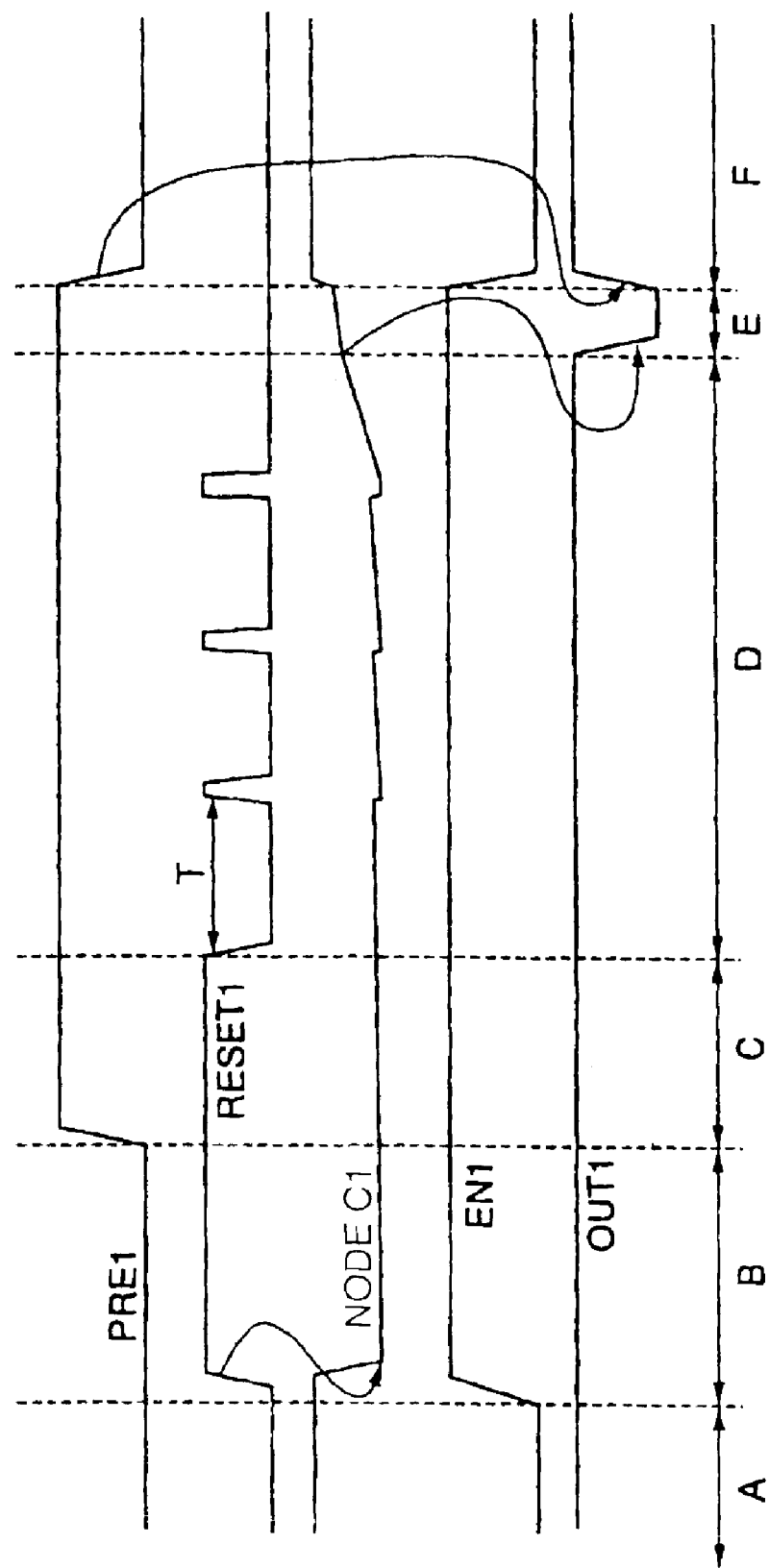
FIG. 3 is a flowchart for explaining an operation of the temperature detection circuit according to the first embodiment of the invention.

An operation of the circuit in FIG. 2 is described with reference to the timing chart shown in FIG. 3.

Time Interval A:

When the pre-charge signal PRE1 renders the PMOS transistor TRp15 conductive at "L" level, and pre-charges the node OUT1 with "H" level, while the input signal EN1 is "L" level and the reset signal RESET1 is "L" level, so that the PMOS transistor TRp11 is rendered in ON state and the NMOS transistor TRn13 is rendered in OFF state, and the node C1 is charged with "H" level. As a result, the NMOS transistor TRn12 is rendered in OFF state and the NMOS transistor TRn14 is rendered in ON state so that the output node OUT1 is held at "H" level.

Time Interval B:

The pre-charge signal PRE1 keeps "L" level and the reset signal RESET1 is changed from "L" level to "H" level, and the signal EN1 is changed from "L" level to "H" level. As a result, electric charge charged in the node C1 is discharged via the NMOS transistor TRn13, and the node C1 is changed from "H" level to "L" level. At this time, the PMOS transistor TRp15 and the NMOS transistor TRn12 are rendered in ON state but the NMOS transistor TRn14 is rendered in OFF state, and hence the output node OUT1 is not changed while keeping "H" level.

Time Interval C:

When the pre-charge signal PRE1 is raised, the PMOS transistor TRp15 is rendered in OFF state to complete the charging (pre-charging) of the output node OUT1. This state is kept until the completion of the time interval E, described later.

Figure 6:
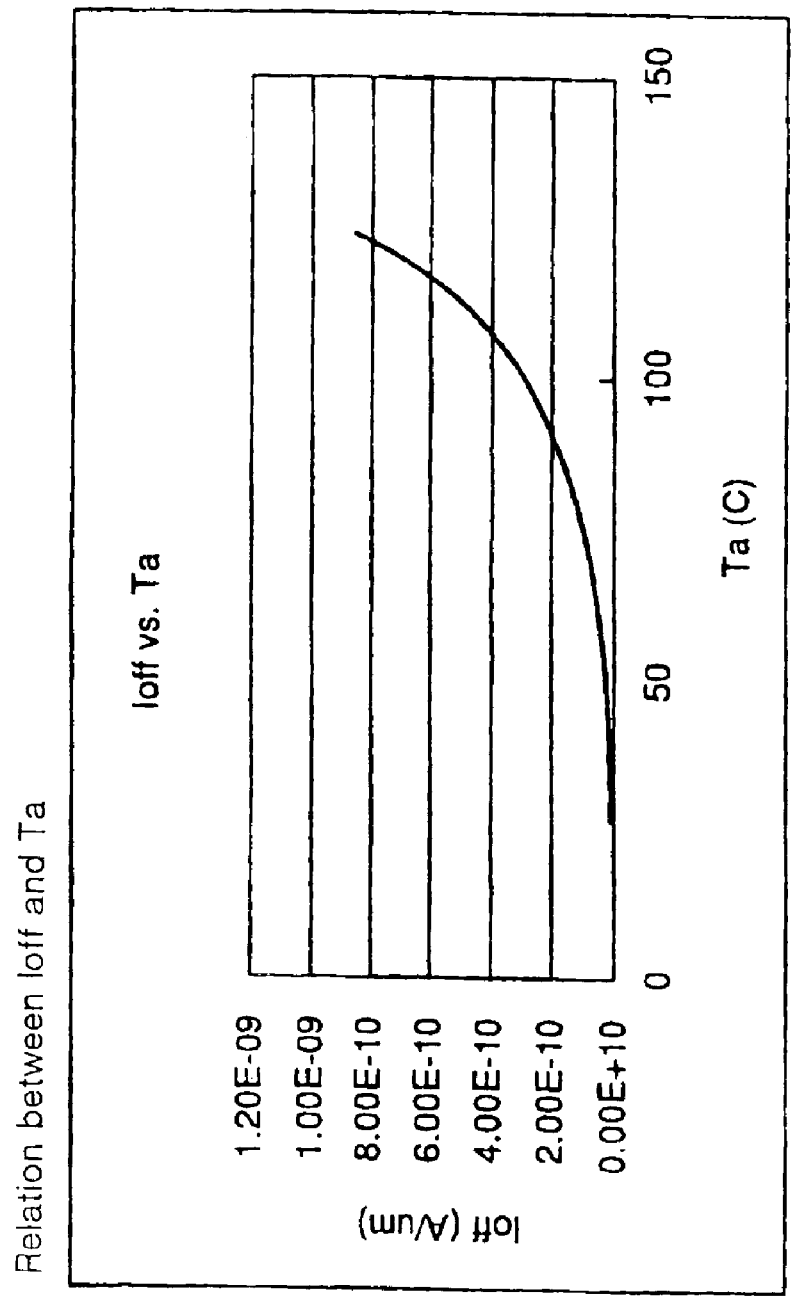
FIG. 6 is a view showing the relation between an off leak current (Ioff) of a MOS transistor per unit of length and a temperature (Ta).

Time Interval D:

The electric charge charged in the node C1 is discharged by inputting the reset signal RESET1 periodically at a given cycle T. A current for charging the node C1 increases exponentially as the temperature increases (Ioff(TRp11) −Ioff(TRp13):Ioff is an off leak current between the PMOS transistor TRp11 and the NMOS transistor TRn13, and temperature characteristics thereof have to be referred to FIG. 6), so that the potential of the node C1 increases during the given cycle T.

Time Interval E:

When the potential of the node C1 increases to exceed the threshold value of the NMOS transistor TRn14, the NMOS transistor TRn14 is rendered in ON state, and since the NMOS transistor TRn12 is in ON state because the input signal EN1 keeps "H" level, the electric charge accumulated in the output node OUT1 during a pre-charge period is discharged so that the potential of the output node OUT1 is changed from "H" level to "L" level. Although the off leak current also flows to the PMOS transistor TRp15 at this time, the current value of this off leak current is of the order of $10^{-9}$(A/um), while the ON current of the inverter pairs (INV11, INV12) which keeps the potential of the output node OUT1 is of the order of $10^{-4}$(A/um), so that the potential of the output node OUT1 is not changed by the off leak current of the PMOS transistor TRp15.

Time Interval F:

If it is detected that the temperature of the CPU chip exceeds a given temperature during the time interval E, the CPU renders the pre-charge signal PRE1 "L" level (valid) and the signal EN1 "L" level upon execution of a given process so that the output node OUT1 is charged with "H" level as an initial state.

The width W of the gate of the PMOS transistor TRp11 which is the off leak current source of this circuit is determined in the following manner. The off leak current of the NMOS transistor per unit of length is the same as that of the PMOS transistor, and they are practically calculated using a value differential between the gate width Wp of the PMOS transistor TRp11 and the gate width Wn of the NMOS transistor TRn13 (Wd=Wp−Wn). The cycle for detecting the temperature is the cycle T of the reset signal RESET1, and assuming that the stray capacitance between the node C1 and the ground is C, a potential V to be increased by the electric charge accumulated in the stray capacitance C can be represented by the following expression (1).

$$V=(10^{(Ta/50)-11.5}*Wd*T)/C \qquad (1)$$

where Ta is the temperature of the CPU chip. Assuming that the setting temperature is Ta=125 (° C.), and C is 10 fF, T=10 ns, V=Wd/10 is established from the expression (1). Accordingly, assuming that the threshold voltage Vth of the NMOS transistor TRn14 is 0.6V, it is sufficient that the gate width Wp of the PMOS transistor TRp11 and the gate width Wn of the NMOS transistor TRn13 are set to meet the expression of Wd=6 μm.

As mentioned above, the CPU reads out the potential of the output node OUT1 via the control circuit 14, and when the CPU detects the change of the potential from "H" level to "L" level, it can stop the system after storing these data in a safe place before these data are broken owing to overdrive thereof by heat and the like. After stopping the system, the CPU initializes the circuit during the time interval F, so that the temperature detection circuit can detect again the temperature.

Figure 4:
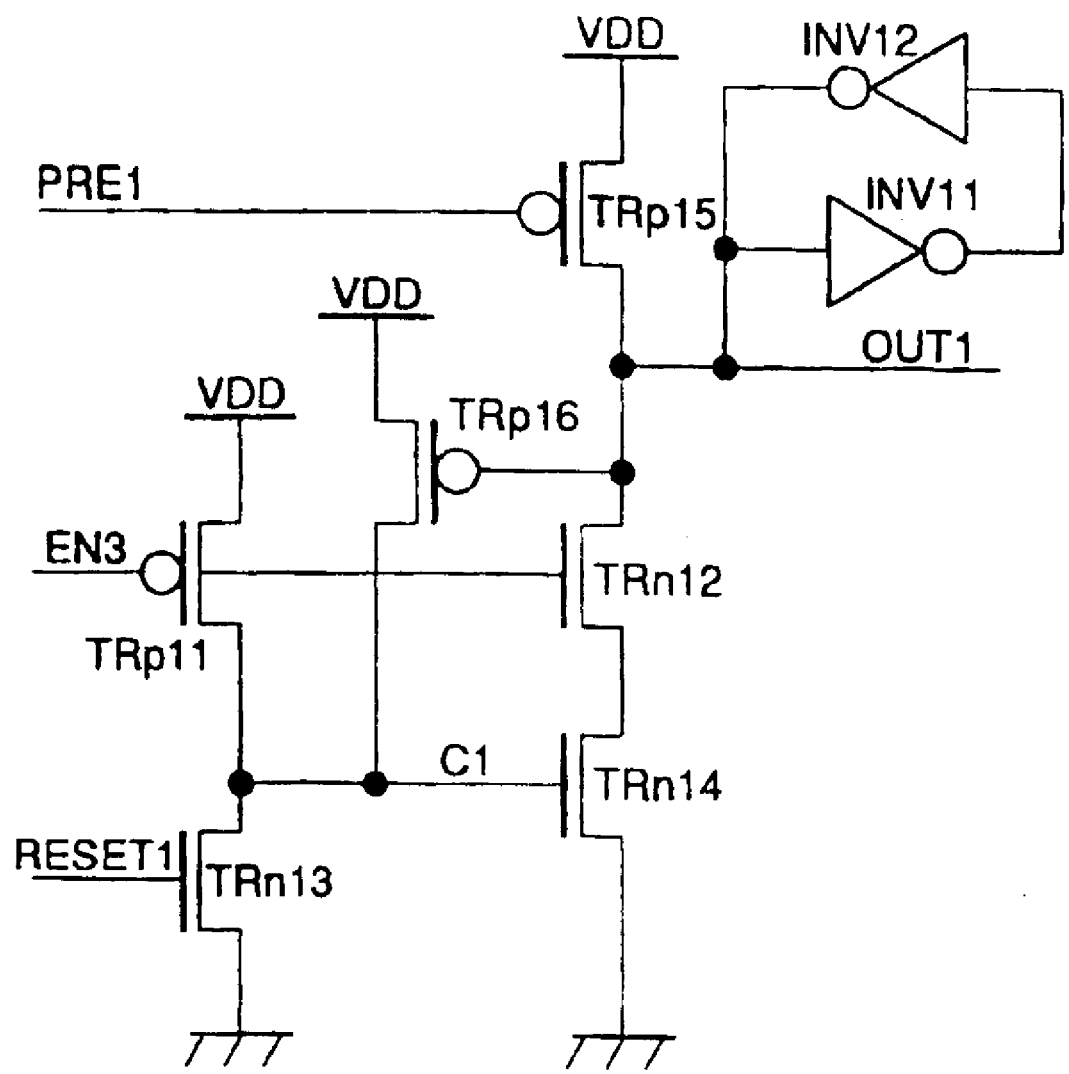
FIG. 4 is a circuit diagram of a temperature detection circuit of a semiconductor device according to a second embodiment of the invention.
Figure 5:
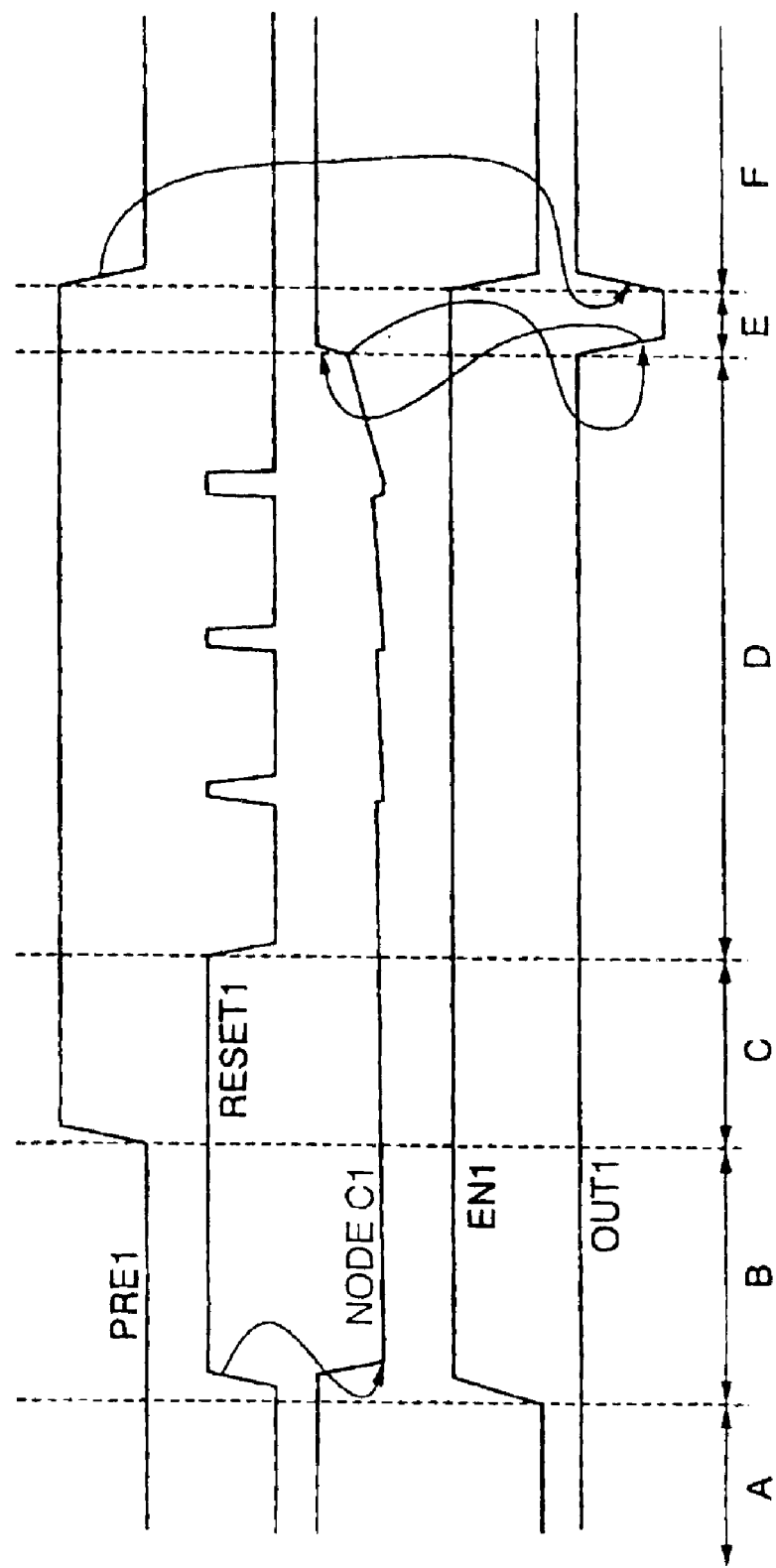
FIG. 5 is a flowchart for explaining an operation of the temperature detection circuit according to the second embodiment of the invention.

Second Embodiment:

FIG. 4 is a circuit diagram of a temperature detection circuit according to a second embodiment of the invention. The temperature detection circuit of the second embodiment shown in FIG. 4 is different from that of the first embodiment in respect of the addition of a PMOS transistor TRp16 which is connected to the output node OUT1 at its gate, to the power supply potential VDD at its source, and to the node C1 (live node) at its drain.

Although an operation of the temperature detection circuit of the second embodiment is the same as that of the first embodiment, the former is different from the latter owing to the addition of the PMOS transistor TRp16. That is, at the end of the time interval D, when the potential of the node C1 exceeds the threshold value of the NMOS transistor TRn14 and the NMOS transistor TRn14 is rendered in ON state, and the potential of the output node OUT1 is changed from "H" level to "L" level, the PMOS transistor TRp16 is rendered in ON state, so that the stray capacitance C of the node C1 is rapidly charged. As a result, when the temperature detection circuit detects that the temperature of the CPU exceeds the set temperature, the output node OUT1 is surely kept at "L" level, thereby preventing the erroneous operation.

As described in detail above, according to the semiconductor device of the invention, since the temperature detection circuit is provided inside the chip which is the same as the CPU, and it comprises a temperature detection part comprised of the PMOS transistor and the NMOS transistor connected in series between the power supply potential VDD and the grounding potential, wherein the stray capacitance between the junction (live node) between the PMOS transistor and the NMOS transistor and the grounding potential is charged with a current differential between the off leak current of the PMOS transistor and the off leak current of the NMOS transistor, thereby changing the potential of the live node, and when the changed potential reaches a threshold voltage in a given period of time, it is decided that the temperature of the CPU reaches a set temperature, thereby providing the semiconductor device provided with the function to control the temperature of the CPU in real time with good accuracy.

What is claimed is:

1. A semiconductor device which is provided with a temperature detection circuit for measuring a temperature of a CPU using a temperature dependency of off leak currents of transistors and which is provided in a chip on which the CPU is mounted, wherein the temperature detection circuit comprises:

a temperature detection part for increasing a potential of a live node connected to a stray capacitance by charging the stray capacitance of the transistors with the off leak currents, and for detecting that a temperature of the CPU reaches a given temperature by comparing a potential level of the live node with a threshold value of a transistor, and a detection signal output part for outputting and holding a detection signal which is driven by a signal issued by the temperature detection part.

2. The semiconductor device according to claim 1, wherein the temperature detection part comprises a first PMOS transistor and a first NMOS transistor connected in series between a power supply potential VDD and a grounding potential, and the live node is a junction between a drain of the first PMOS transistor and a drain of the first NMOS transistor, and the stray capacitance between the live node and the grounding potential is charged with a current differential between the off leak current of the first PMOS transistor and the off leak current of the first NMOS transistor when the first PMOS transistor and the first NMOS transistor are in OFF state.

3. The semiconductor device according to claim 2, wherein the detection signal output part comprises:

a second PMOS transistor connected between the power supply potential VDD and the grounding potential, a series circuit comprised of second and third NMOS transistors connected in series to each other, and a data holding circuit connected to an output node of the series circuit, wherein a drain of the second PMOS transistor is connected to the output node and a drain of the second NMOS transistor, a gate of the second NMOS transistor is connected to a gate of the first PMOS transistor, a source of the second NMOS transistor is connected to a drain of the third NMOS transistor, a gate of the third NMOS transistor is connected to the live node, and a source of the third NMOS transistor is grounded, and wherein the output node is pre-charged by the second PMOS transistor when starting detection of the temperature, and the second and third NMOS transistors are rendered in an ON state when a potential of the live node exceeds a threshold value of the third NMOS transistor, so that a pre-charged electric charge accumulated in the output node is discharged to change a potential of the output node, whereby the changed potential is held in the data holding circuit.

4. The semiconductor device according to claim 3, wherein the detection signal output part further comprises a third PMOS transistor having a source connected to the power supply potential VDD, a gate connected to the output node, and a drain connected to the live node, wherein said third PMOS transistor is rendered in the ON state when the temperature of the CPU reaches a set temperature, so that the pre-charged electric charge of the output node is discharged to accelerate the charging of the stray capacitance of the live node.

5. A detection circuit that detects a temperature of a CPU, the detection circuit and the CPU being mounted on a same chip, the detection circuit comprising:

a precharge circuit that precharges an output node;

a transistor pair that charge a stray capacitance at a live node with off leak current that is temperature dependent; and a switch, coupled between the output node and ground, that discharges the output node responsive to a potential at the live node, so that a potential of the output node is indicative that the CPU exceeds a predetermined temperature.

6. The detection circuit of claim 5, wherein said transistor pair comprises a first PMOS transistor and a first NMOS transistor coupled together in series between a power supply potential and ground, wherein the live node is a junction between a drain of the PMOS transistor and a drain of the NMOS transistor.

7. The detection circuit of claim 6, wherein said switch comprises second and third NMOS transistors coupled together in series between the output node and ground, wherein the third NMOS transistor is responsive to the potential at the live node.

8. The detection circuit of claim 7, wherein the second NMOS transistor has a gate coupled to a gate of the first PMOS transistor, a drain coupled to the output node, and a source, and the third NMOS transistor has a gate coupled to the live node, a drain coupled to the source of the second NMOS transistor, and a source coupled to ground.

9. The detection circuit of claim 6, further comprising a second PMOS transistor having a gate coupled to the output node, a source coupled to the power supply potential and a drain coupled to the live node.

10. The detection circuit of claim 6, wherein said precharge circuit comprises a second PMOS transistor having a gate coupled to a precharge control signal, a source coupled to the power supply potential and a drain coupled to the output node.

11. The detection circuit of claim 5, further comprising a holding circuit that holds the potential of the output node.

* * * * *